(12) United States Patent
Wada et al.

(10) Patent No.: US 10,710,921 B2
(45) Date of Patent: Jul. 14, 2020

(54) METHOD FOR MANUFACTURING MEDICAL VIAL

(71) Applicant: NIPRO CORPORATION, Osaka-shi, Osaka (JP)

(72) Inventors: Masamichi Wada, Osaka (JP); Atsushi Ishikawa, Osaka (JP)

(73) Assignee: NIPRO CORPORATION (JP)

( * ) Notice: Subject to any disclaimer, the term of this patent is extended or adjusted under 35 U.S.C. 154(b) by 0 days.

(21) Appl. No.: 16/597,164

(22) Filed: Oct. 9, 2019

(65) Prior Publication Data

US 2020/0039867 A1 Feb. 6, 2020

Related U.S. Application Data

(62) Division of application No. 15/564,784, filed as application No. PCT/JP2016/061309 on Apr. 6, 2016, now abandoned.

(30) Foreign Application Priority Data

Apr. 9, 2015 (JP) .................................. 2015-080466

(51) Int. Cl.
*C03B 32/00* (2006.01)
*A61J 1/06* (2006.01)
(Continued)

(52) U.S. Cl.
CPC ................. *C03B 32/00* (2013.01); *A61J 1/06* (2013.01); *C03B 29/02* (2013.01); *C03C 3/091* (2013.01); *C03C 4/20* (2013.01); *C03C 2204/00* (2013.01)

(58) Field of Classification Search
CPC . C03B 32/00; C03B 29/02; A61J 1/06; C03C 3/091; C03C 4/20; C03C 2204/00
See application file for complete search history.

(56) References Cited

U.S. PATENT DOCUMENTS

| 2009/0099000 | A1 | 4/2009 | Kuwabara et al. |
| 2010/0255229 | A1 | 10/2010 | Wada |
| 2014/0151370 | A1 | 6/2014 | Chang |

FOREIGN PATENT DOCUMENTS

| JP | H0676233 B2 | 9/1994 |
| JP | 2010269973 A | 12/2010 |

(Continued)

OTHER PUBLICATIONS

"Evaluation of the Inner Surface Durability of Glass Containers", USP 1660; Apr. 17, 2012.

(Continued)

*Primary Examiner* — Michael C Miggins
(74) *Attorney, Agent, or Firm* — Jordan and Koda, PLLC

(57) ABSTRACT

[Object] To provide a means manufacturing a medical vial which contains a Type IA borosilicate glass as the raw material and in which the elution amount of silica into a high ionic strength solution decreases to be equal to or less than the silica elution amount in a Type IB borosilicate glass.
[Solution] A method for manufacturing a medical vial is a method for manufacturing a medical vial including a fire blast process of applying a flame ejected from a point burner to a deteriorated layer generated on the inner surface of a vial, in which the vial is molded from a glass tube containing a Type IA borosilicate glass as the raw material and the molar ratio of oxides contained in the borosilicate glass satisfies $\psi=0.23\pm0.02$ in $\psi=[(Na_2O+K_2O)-Al_2O_3]/B_2O_3$ and satisfies $\beta=7.5\pm0.5$ in $\beta=B_2O_3/Al_2O_3$.

4 Claims, 2 Drawing Sheets

(51) Int. Cl.
   *C03C 3/091*  (2006.01)
   *C03B 29/02*  (2006.01)
   *C03C 4/20*   (2006.01)

(56) References Cited

FOREIGN PATENT DOCUMENTS

| | | |
|---|---|---|
| JP | 2014214084 A | 11/2014 |
| JP | 2015013793 A | 1/2015 |
| WO | 2006/123621 A1 | 11/2006 |
| WO | 2013/185018 A1 | 12/2013 |
| WO | 2014/085242 A1 | 6/2014 |

OTHER PUBLICATIONS

"Standard Specification for Glasses in Laboratory Apparatus", ASTM International Designation: E 438-92; Jan. 30, 2013.

Guadagnino, Emanuel et al.; "Delamination Propensity of Pharmaceutical Glass Containers by Accelerated Testing with Different Extraction Media", PDA J Pharm Sci and Tech, 2012, pp. 116-125.

"Simax glass mass", Kavalierglass of North America, http://www.simax.com/enisection/32-simax-glass-mass.html. 4 pages, per Wayback Machine (Year: 2013).

"Greenline Tubular Gauge Glass", Pegasus Industrial Specialties, Inc. http://www.switchtogreenline.com/quality.aspx, 1 page, per Wayback Machine (Year 2013).

METHOD FOR MANUFACTURING MEDICAL VIAL

TECHNICAL FIELD

The present invention relates to a method for manufacturing a medical vial with less elution of silica and the like from a glass wall inner surface.

BACKGROUND ART

As raw materials of a medical glass container, such as a medical vial, borosilicate glass excellent in chemical durability has been used in many cases. The borosilicate glass is molded into a glass tube to be used as a raw material of the medical glass container. Such a glass tube includes Type I, Class B having an expansion coefficient ($\times 10^{-7}$/K) of 48 or more and 56 or less (hereinafter also referred to as Type IB) and Type I, Class A having an expansion coefficient ($\times 10^{-7}$/K) of 32 or more and 33 or less (hereinafter also referred to as Type IA) described in Non-Patent Literature 1 (Non-Patent Literature 1). A medical vial manufactured using glass having a low expansion coefficient as the raw material is hard to cause breakage due to rapid temperature changes. Therefore, a Type IA borosilicate glass tube having a low expansion coefficient has been used as the raw material of the medical vial which is required to have durability against rapid temperature changes, such as freezing/thawing.

In order to manufacture a medical vial from the borosilicate glass tube, a mouth portion and a bottom portion of the vial are molded in the glass tube by heating with high temperature flames. In a process in which the bottom portion is molded from the glass tube, alkaline components volatilized from the glass tube due to the heating of the glass tube condense particularly on the inner surface near the bottom portion, so that a deteriorated layer is formed. The alkaline components are eluted from such a deteriorated layer into a pharmaceutical agent and the like in the vial. To address the problem, the alkaline component of elution standard is established in European Pharmacopoeia and United States Pharmacopoeia and ISO4802-1 or ISO4802-2.

As a method for reducing the elution of alkaline components, an ammonium sulfate treatment method including causing alkaline components and sulfate present in a deteriorated layer to react with each other to generate sodium sulfate ($Na_2SO_4$), and then removing the sodium sulfate by washing with water and a chemical vapor deposition (CVD method) including covering a vial inner surface with a silica ($SiO_2$) thin film are known (Patent Literature 1). Moreover, it is known that a deteriorated layer generated on the inner surface of a vial is subjected to fire blasting with an oxygen-gas flame by a point burner while rotating the vial molded from a glass tube, whereby the deteriorated layer is removed, so that the elution of alkaline components is reduced (Patent Literatures 2 and 3).

CITATION LIST

Patent Literatures

[Patent Literature 1] Japanese Examined Patent Application Publication No. 6-76233
[Patent Literature 2] International Publication No. WO2006/123621
[Patent Literature 3] Japanese Unexamined Patent Application Publication No. 2010-269973

Non-Patent Literatures

[Non Patent Literature 1] ASTM INTERNATIONAL Designation: E 438-92 (Preapproved 2011)
[Non-Patent Literature 2] "Evaluation of the Inner Surface Durability of Glass Containers" USP 1660
[Non-Patent Literature 3] "Delamination Propensity of Pharmaceutical Glass Containers by Accelerated Testing with Different Extraction Media", PDA J Pharm Sci and Tech, 2012, 66116-125

SUMMARY OF INVENTION

Technical Problems

In recent years, in addition to the problem of the elution of alkaline components, mixing of silica particle and flakes separated from the inner surface of a vial in a pharmaceutical agent in the vial is regarded as a problem. In the description of <1660>"Evaluation of durability of glass container inner surface" in United States Pharmacopeia (USP), a vial screening method is described which includes evaluating the amount of silica ($SiO_2$) eluted by heating the vial at 121° C. for 2 hours using a high ionic strength solution of 0.9% KCl aqueous solution (pH 8.0) (Non-Patent Literature 2).

A vial containing a Type IA borosilicate glass as the raw material is excellent in water resistance and acid resistance. On the other hand, when an evaluation of the durability against a high ionic strength solution using an alkaline 0.9% KCl aqueous solution (pH 8.0) is performed, the elution amount of silica from the vial is very large as compared with that of a Type IB borosilicate glass, so that a risk of the generation of flakes of silica ($SiO_2$) is high. Therefore, a negative conclusion to the use of the Type IA borosilicate glass for a vial storing an alkaline high ionic strength solution is drawn (Non-Patent Literature 3).

The present invention has been made in view of the above-described circumstances. It is an object of the present invention to provide a means reducing the elution amount of silica into a high ionic strength solution in a medical vial molded using a Type IA borosilicate glass having a low expansion coefficient and excellent heat shock resistance as the raw material to be equal to or less than the silica elution amount in the case of a medical vial molded using a Type IB borosilicate glass.

Solution to Problems (1) A method for manufacturing a medical vial according to the present invention is a method for manufacturing a medical vial including a fire blast process of applying a flame ejected from a point burner to a deteriorated layer generated on the inner surface of a vial, in which the vial is molded from a glass tube containing a Type IA borosilicate glass as the raw material and the molar ratio of oxides contained in the borosilicate glass satisfies $\psi=0.23\pm0.02$ in $\psi=[(Na_2O+K_2O)-Al_2O_3]/B_2O_3$ and satisfies $\beta=7.5\pm0.5$ in $\beta=B_2O_3/Al_2O_3$.

The medical vial is manufactured by performing heat processing of a glass tube. When the borosilicate glass as a material of the glass tube is heated, alkali borate contained in the borosilicate glass is volatilized. When the volatilized alkali borate condenses on the inner surface of the vial, a deteriorated layer is generated. In the fire blast process, the deteriorated layer generated on the inner surface of the vial is discharged to the outside.

Moreover, the Type IA borosilicate glass has high durability against temperature changes. Therefore, a medical vial obtained using the Type IA borosilicate glass as the raw material has durability against temperature changes.

The structure and the physical properties of the Type IA borosilicate glass vary depending on the content of oxides ($Na_2O$, $K_2O$, $Al_2O$, and $B_2O_3$) contained in the borosilicate glass. As the molar ratio of the oxides contained in the Type IA borosilicate glass, $\psi$ is approximately ¼ in $\psi=[(Na_2O+K_2O)-Al_2O_3]/B_2O_3$ (M. B. Volf: Technical Approach to Glass. Elsevier, 1990, p. 161). Among the above, the molar ratio of oxides contained in a typical Type IA borosilicate glass satisfies $\psi=0.23\pm0.02$.

When the Type IA borosilicate glass satisfies $\beta=7.5\pm0.5$ in $\beta=B_2O_3/Al_2O_3$ in addition to the fact that the Type IA borosilicate has the composition conditions described above, silica ($SiO_2$) which is easily separated is present in a deteriorated layer of a medical vial manufactured from the borosilicate glass. The deteriorated layer is easily removed by the fire blast (FB) process. Therefore, a vial is obtained which has an elution amount of silica into a high ionic strength solution equal to the silica elution amount in a medical vial processed from a Type IB borosilicate glass tube.

(2) Preferably, a value obtained by quantifying silica eluted into a high ionic strength solution having a KCl concentration of 0.9 wt/wt % and a pH of 8 from an area per $cm^2$ in the total surface area of the vial by heating the vial after the fire blast process at 121° C. for 2 hours in a state where the vial is immersed in the high ionic strength solution using an ICP-AES method is 20.0 μg/$cm^2$ or less.

(3) Preferably, the high ionic strength solution is a solution containing 0.1 mol/L or more of alkali salt.

Advantageous Effects of Invention

According to the present invention, in a medical vial molded using a Type IA borosilicate glass as the raw material, the elution amount of silica into a high ionic strength solution can be reduced to be equal to the silica elution amount in the case of using a Type IB borosilicate glass.

DESCRIPTION OF EMBODIMENTS

Hereinafter, a preferable embodiment of the present invention is described. It is a matter of course that this embodiment is merely one embodiment of the present invention and the embodiment can be altered in the range where the scope of the present invention is not altered.

[Vial 10]

Figure 1:
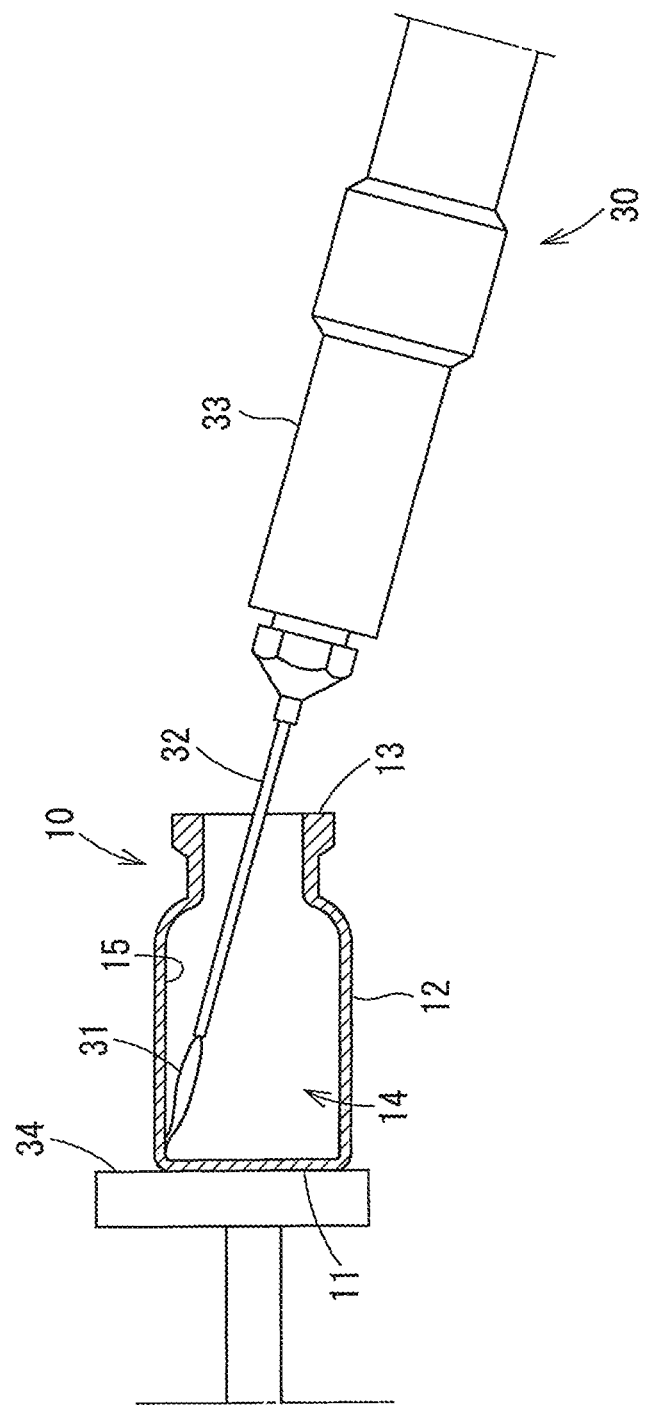
FIG. 1 is a view for explaining a fire blast process.

As illustrated in FIG. 1, a vial 10 is a container having a bottom portion 11, aside surface portion 12, and a mouth portion 13 in order from the position serving as the bottom portion in use and has an internal space 14 thereinside. The vial 10 is closed in the bottom portion 11. The vial 10 opens in an end portion of the mouth portion 13. The inner diameter of the mouth portion 13 is narrower than the inner diameter of the internal space 14. The vial 10 is molded by performing heat processing of a glass tube 20. The vial 10 is an example of a medical vial. The medical vial is a container capable of storing medicines, living body samples, such as blood and cell suspension, liquid medicines, and the like in order to keep, for example, the same thereinside. The medical vial includes, for example, an intermediate article obtained in the middle of a vial molding process, i.e., an intermediate article in which only a bottom portion is formed and a mouth portion is not formed, and those equivalent to a medical vial, such as an ampule.

The main raw material of the glass tube 20 is a Type IA borosilicate glass. Borosilicate glass mainly contains five kinds of oxides of silica ($SiO_2$), boron oxide ($B_2O_3$), aluminum oxide ($Al_2O_3$), sodium oxide ($Na_2O$), and potassium oxide ($K_2O$). The structure and the physical properties of the borosilicate glass vary depending on the composition ratio of the oxides contained in the borosilicate glass.

In the silica ($SiO_2$) as the main component, a silicon (Si) atom is bonded to four oxygen (O) atoms to forma network structure in glass. An oxygen [Si—O—Si] atom bonded to two Si atoms is referred to as crosslinking oxygen. On the other hand, $Na_2O$ and $K_2O$ bonded to silica form non-crosslinking oxygen of [≡Si—O—Na] or [≡Si—O—K]. The non-crosslinking oxygen generates a cleavage of the bond in the borosilicate glass. As a result, when the content of $Na_2O$ and $K_2O$ is large, the expansion coefficient of the borosilicate glass increases and the chemical durability thereof decreases.

On the other hand, an aluminum ion [$AlO_3$] bonded to three oxygen (O) atoms in glass attracts non-crosslinking oxygen to form an aluminum ion [$AlO_4$] bonded to four oxygen (O) atoms to be incorporated into the network structure in glass. As a result, the expansion coefficient of the borosilicate glass decreases and the chemical durability thereof increases.

A boron ion [$BO_3$] bonded to three oxygen (O) atoms in glass is bonded to non-crosslinking oxygen remaining after the aluminum ion [$AlO_3$] is incorporated into the network structure to be incorporated into the network structure. More specifically, in the bond with non-crosslinking oxygen, an aluminum ion [$AlO_3$] has priority over a boron ion [$BO_3$]. When an excess amount of aluminum oxide ($Al_2O_3$) is present and is bonded to all non-crosslinking oxygen atoms, a boron ion is not incorporated into the network structure and remains to be three-coordinated [$BO_3$]. As a result, the chemical durability against a high ionic strength solution of the borosilicate glass decreases.

As the raw material of the glass tube 20, borosilicate glass is preferably used in which the molar ratio of the oxides contained in the borosilicate glass satisfies $\psi=0.23\pm0.02$, i.e., $\psi=0.21$ or more and 0.25 or less, in $\psi=[(Na_2O+K_2O)-Al_2O_3]/B_2O_3$. $\psi$ is determined by dividing the number of moles of the non-crosslinking oxygen remaining after aluminum ion [$AlO_3$] is incorporated into the network structure by the number of moles of $B_2O_3$ in the borosilicate glass. $\psi$ is a parameter relating to the composition ratio of $Na_2O$, $K_2O$, $Al_2O_3$, and $B_2O_3$. Therefore, $\psi$ is treated as a parameter showing the structure and the physical properties affected by the composition of the borosilicate glass. When a glass tube 20 of Type IA having $\psi$ of less than 0.21 is used, the elution amount of silica into a high ionic strength solution of the obtained vial 10 increases. The high ionic strength solution refers to a solution containing 0.1 mol/L or more of alkali salt. Examples of the alkali salt include KCl and the like, for example. Examples of the high ionic strength solution include, for example, a KCl aqueous solution having a concentration 0.9 wt/wt % (pH 8) and the like. When a glass tube 20 of Type IA having ψ of larger than 0.25 is used, a three-coordinated boron ion [$BO_3$] increases, and the chemical durability of the vial 10 against a high ionic strength solution decreases.

As the raw material of the glass tube 20, it is preferable to use borosilicate glass satisfying β=7.5±0.5, i.e., β is 7.0 or more and 8.0 or less, in β=$B_2O_3$/$Al_2O_3$ obtained by dividing the molar ratio of $B_2O_3$ by the molar ratio of $Al_2O_3$ in addition to the molar ratio conditions described above. The durability against a high ionic strength solution of the borosilicate glass having such a β value is high as in the case of a Type IB borosilicate glass. A deteriorated layer generated in a medical vial manufactured from the borosilicate glass is easily removed by the fire blast process. The deteriorated layer is one in which alkali borate volatilized from borosilicate glass heated to a high temperature is denatured by reacting with the borosilicate glass. The deteriorated layer is the cause of the elution of alkaline components into a solution and the generation of silica particle and flakes.

In the case where an excess amount of boron oxide in the borosilicate glass is present relative to aluminum oxide, the elution amount of silica into the high ionic strength solution from the deteriorated layer increases when β is larger than 8.0, for example. When β is smaller than 7.0, the viscosity of the borosilicate glass increases, which makes it difficult to melt the glass.

[Method for Manufacturing Vial 10]

A method for manufacturing the vial 10 includes a vial molding process and a fire blast process. The vial molding process is a process of processing and molding the shape of the vial 10 from the glass tube 20. The fire blast process is a process of applying a flame 31 ejected from a point burner 30 to an inner surface 15 of the vial 10.

In the vial molding process, alkali borate, such as $NaBO_2$ and/or $HBO_2$, is volatilized by heating from the borosilicate glass forming the glass tube 20. The volatilized alkali borate condenses near the bottom portion 11 on the inner surface 15 of the molded vial 10. The condensed alkali borate reacts with the borosilicate glass near the bottom portion 11, so that a deteriorated layer is generated near the bottom portion 11. In the deteriorated layer, silica is likely to be eluted into a high ionic strength solution or separated. The high ionic strength solution refers to a solution containing 0.1 mol/L or more of alkali salt. Examples of the high ionic strength solution include a 0.9 wt/wt % (pH 8) KCl aqueous solution, for example.

After the vial molding process, the inside of the vial 10 was filled with a 0.05 wt/wt % methylene blue solution, and then the vial 10 is allowed to stand still for 20 minutes. Subsequently, the methylene blue solution is discharged from the inside of the vial 10, and then the vial 10 is washed with distilled water. The washed vial 10 is heated at 120° C. for 10 minutes to be dried. The methylene blue is adsorbed to a deteriorated layer, and thus the deteriorated layer on the vial inner surface is colored with the methylene blue. This clarifies a portion where the deteriorated layer to be removed is present. The deteriorated layer is likely to be generated near the bottom portion 11.

[Fire Blast Process]

In order to remove the deteriorated layer generated on the inner surface 15 of the molded vial 10, a fire blast process is performed. The fire blast process is a process of applying a flame ejected from the point burner 30 to the inner surface 15 of the vial 10. During the fire blast process, the vial 10 is rotated. As illustrated in FIG. 1, the point burner 30 has a burner body 33 and a nozzle 32 and is connected to a flow rate control device (not illustrated) of inflammable gas and oxygen. A known device can be used as the flow rate control device. The nozzle 32 is connected to the tip side of the burner body 33. The nozzle 32 has a straw shape and allows a mixed gas flowing out of the burner body 33 to pass therethrough. The outer diameter of the nozzle 32 allows the insertion of the nozzle 32 into an internal space 14 of the vial 10 and is sufficiently smaller than the inner diameter of a neck portion 18 of the vial 10. The length in the axial direction of the nozzle 32 is sufficiently larger than the length along the axial direction of the vial 10. As a raw material of the nozzle 32, one having high heat resistance, such as ceramic, is preferable, for example.

The nozzle 32 at the tip of the point burner 30 is inserted into the internal space 14 of the vial 10 through the mouth portion 13. The gas and the oxygen drawn into the point burner 30 are mixed. The gas is inflammable gas, and methane gas is mentioned, for example. The mixed gas is ejected from the nozzle 32. The mixed gas is ejected as the flame 31 while burning. The flame 31 ejected from the nozzle 32 is sprayed onto the inner surface 15 of the vial 10. The spraying of the flame 31 is performed for about 10 seconds, when the capacity of the vial is 5 mL, for example. Moreover, the spraying of the flame 31 is preferably performed so that the flame 31 is applied to the vicinity of the bottom portion 11 where the deteriorated layer is present.

The tip of the nozzle 32 is adjusted so that the distance between the tip of the nozzle 32 and the inner surface of the vial has a fixed distance in such a manner that the most optimal portion of the flame 31 ejected from the nozzle 32 is applied to the inner surface 15 of the vial 10. The most suitable portion of the flame 31 is a portion containing the largest amount of plasma. The portion rich in plasma of the flame 31 is a portion rich in oxonium ion ($H_3O^+$) (POSITIVE ION PROBE OF METHANE-OXYGEN COMBUTION, J. M. GOODINGS and D. K. BOHME, International Symposium on Combustion, Volume 16, Issue 1, 1977, Pages 891-902).

The plasma contained in the flame 31 evaporates and removes the deteriorated layer generated on the inner surface 15 of the vial 10. Substances forming the removed deteriorated layer are discharged to the outside from the vial 10.

The rotation of the vial 10 is performed by the rotation of the support base 34 supporting the vial 10, for example. The support base 34 may be moved up and down so that the flame 31 is uniformly applied in the vertical direction of from the mouth portion 13 to the bottom portion 11 of the vial 10. Thus, the flame 31 is applied to the entire inner surface 15 of the vial 10 while being scanned, so that the deteriorated layer generated on the inner surface 15 of the vial 10 is sufficiently removed.

The position where the deteriorated layer is present in the vial 10 varies depending on a method for molding the vial 10, e.g., a method including molding the vial 10 with the axis line of the glass tube 20 along the vertical direction, a method including molding the vial 10 with the axis line of the glass tube 20 along the horizontal direction, the fact that either the bottom portion 11 or the mouth portion 13 of vial 10 is formed first, and the like. Therefore, when the deteriorated layer widely spreads on the inner surface 15 of the vial 10, for example, the support base 34 may be moved so that the flame 31 is uniformly applied to the entire inner surface 15 of the vial 10.

Operational Effects of this Embodiment

According to this embodiment, in the vial 10 molded using the Type IA borosilicate glass to be used for storing pharmaceutical agents and the like as the raw material, the vial 10 is obtained from which the deteriorated layer generated on the inner surface 15 of the vial 10 is removed. Therefore, the amount of silica ($SiO_2$) eluted from the vial 10 into a high ionic strength solution decreases. Therefore, bypassing through the fire blast process, the vial 10 molded using the Type IA borosilicate glass as the raw material has not only high durability against rapid temperature changes in freeze dry but excellent durability against a high ionic strength solution equivalent to the durability of a vial molded using a Type IB borosilicate glass as the raw material.

[Modification]

The embodiment described above describes the method for manufacturing the vial 10 as a medical glass container. However, manufacturing of ampules, syringes, medicine bottles, and the like as a medical glass container can also be achieved.

EXAMPLES

Hereinafter, Examples of the present invention are described.

Examples 1 and 2

In Examples 1 and 2, glass tubes 20 molded from a Type IA borosilicate glass were used. The compositions (mol %) of the borosilicate glass of the glass tubes 20 used for Examples are shown in Table 1.

TABLE 1

Type IA glass composition (mol %), $\psi$, $\beta$, and silica ($SiO_2$) elution amount ($\mu g/cm^2$) due to heating at 121° C. for 2 hours when a solvent is distilled water for injection

| | | Composition (mol %) | | | | |
|---|---|---|---|---|---|---|
| | | ASTM Type IA | Com. Ex. | Ex. 1 | Ex. 2 | ASTM Type IB |
| | $SiO_2$ | 83.27 | 82.16 | 83.04 | 83.12 | |
| | $B_2O_3$ | 11.53 | 12.29 | 11.51 | 11.15 | |
| | $Al_2O_3$ | 1.21 | 1.34 | 1.47 | 1.55 | |
| | $Na_2O$ | 3.99 | 4.20 | 3.62 | 4.15 | |
| | $K_2O$ | 0.00 | 0.00 | 0.36 | 0.03 | |
| | $\psi$ | 0.241 | 0.233 | 0.218 | 0.236 | |
| | $\beta$ | 9.53 | 9.17 | 7.83 | 7.19 | |
| $SiO_2$ elution amount ($\mu g/cm^2$) | Glass tube | | 0.2 | 0.2 | 0.2 | 0.4 |
| | Standard vial | | 3.8 | 2.8 | 2.3 | 13.8 |
| | FB vial | | 0.1 | 0.1 | 0.1 | |

As shown in Table 1, the molar ratio of the oxides contained in the borosilicate glass in the glass tubes 20 used for Examples 1 and 2 satisfied $\psi=0.23\pm0.02$ in $\psi=[(Na_2O+K_2O)-Al_2O_3]/B_2O_3$ and satisfied $\beta=7.5\pm0.5$ in $\beta=B_2O_3/Al_2O_3$. $Na_2O$, $K_2O$, $Al_2O_3$, and $B_2O_3$ in the equations represent the molar ratio (mol %) of each oxide contained in the borosilicate glass.

[Manufacturing of Vial 10]

In a vial molding process, a vial having a capacity of 3 mL was created from the glass tube 20. Moreover, the processing of the vial 10 was performed using a standard vertical die molding machine. After the vial molding process, the inside of the vial 10 was filled with a 0.05 wt/wt % methylene blue solution, and then the vial 10 was allowed to stand still for 20 minutes. Subsequently, the methylene blue solution was discharged from the inside of the vial 10, and then the inside of the vial 10 was washed with distilled water. The washed vial 10 was dried at 120° C. for 10 minutes. Thus, the deteriorated layer on the vial inner surface was colored with the methylene blue, so that a region where the deteriorated layer was present was able to be visually observed.

The created vial 10 was subjected to the fire blast process in the embodiment described above. As the nozzle of the point burner 30, an alumina nozzle having an inner diameter of 1.0 mm was used. As fuel, a mixed gas was used in which methane gas and oxygen were mixed. As the mixed gas, a mixed gas was used in which methane gas with a flow rate of 0.5 L/min and oxygen with a flow rate of 1.1 L/min were mixed. A flame ejected from the nozzle of the point burner 30 was applied to the region where the deteriorated layer was present of the inner surface 15 of the vial 10. The vial 10 was rotated with a rotating machine or the like. By the rotation of the vial 10, the flame was uniformly applied to the entire inner surface 15 of the vial 10. Thus, vials 10 of Examples 1 and 2 were obtained.

Comparative Example

In Comparative Example, a glass tube 20 molded from a Type IA borosilicate glass was used. In Comparative Example, the glass tube 20 was used in which the molar ratio of the oxides contained in the borosilicate glass satisfied $\psi=0.23\pm0.02$ in $\psi=[(Na_2O+K_2O)-Al_2O_3]/B_2O_3$ but did not satisfy $\beta=7.5\pm0.5$ in $\beta=B_2O_3/Al_2O_3$. The composition of the borosilicate glass in the glass tube 20 used for Comparative Example is shown in Table 1.

A vial 10 of Comparative Example was molded by the same vial molding process as that of Examples. The fire blast process in the vial 10 of Comparative Example was also performed in the same manner as in Examples.

[Elution Amount of Silica ($SiO_2$) from Glass Tube 20]

The silica elution amount was measured for each glass tube 20 used for Examples 1 and 2 and Comparative Example. As a solvent for elution, distilled water for injection or a KCl aqueous solution having a concentration of 0.9 wt/wt % (pH 8) was used. The KCl aqueous solution is an aqueous solution in which the pH was adjusted to 8 by adding a NaOH aqueous solution so that the KCl concentration finally reached 0.9 wt/wt %. The distilled water for injection or the KCl aqueous solution having a concentration of 0.9 wt/wt % (pH 8) as the solvent was charged into a Teflon (Registered Trademark) beaker. Each glass tube was immersed in the Teflon (Registered Trademark) beaker charged with the solvent. Each immersed glass tube 20 was heated at 121° C. for 2 hours using an autoclave with Teflon (Registered Trademark) beaker. After cooling, the amount of the silica eluted into the solvent in each Teflon (Registered Trademark) beaker was measured. The measurement of the silica was performed by an ICP-AES method (Inductively Coupled Plasma Atomic Emission Spectrometry). The amount ($\mu g/cm^2$) of the silica obtained for each glass tube 20 of Examples 1 and 2 and Comparative Example is shown in Tables 1 and 2. Table 1 shows the silica elution amount when distilled water for injection was used as the solvent for elution. Table 2 shows the silica elution amount when the KCl aqueous solution having a concentration of 0.9 wt/wt % (pH 8) was used as the solvent for elution. The amount ($\mu g/cm^2$) of the eluted silica was expressed as a value per $cm^2$ of the surface area of each glass tube 20. The surface area of the glass tube 20 was determined by calculation from the inner diameter of the standard, the outer diameter of the standard, and the actual length in terms.

TABLE 2

$\psi$ and $\beta$ of Type IA glass and silica (SiO$_2$) elution amount ($\mu$g/cm$^2$) due to heating at 121° C. for 2 hours when a solvent is 0.9% KCl (pH 8)

| | | Composition (mol %) | | | | |
|---|---|---|---|---|---|---|
| | | ASTM Type IA | Com. Ex. | Ex. 1 | Ex. 2 | ASTM Type IB |
| | $\psi$ | 0.241 | 0.233 | 0.218 | 0.236 | |
| | $\beta$ | 9.53 | 9.17 | 7.83 | 7.19 | |
| SiO$_2$ elution amount ($\mu$g/cm$^2$) | Glass tube | | 23.3 | 10.5 | 6.4 | 4.1 |
| | Standard vial | | 51.2 | 26.9 | 13.4 | 11.3 |
| | FB vial | | 50.0 | 17.6 | 7.3 | |

As shown in Table 1, when the solvent was distilled water for injection, the elution amounts of the silica from the glass tubes 20 of Examples 1 and 2 and Comparative Example were all 0.2 μg/cm and were equal in Examples and Comparative Example. Therefore, it was confirmed that the Type IA borosilicate glass satisfying ψ=0.23±0.02 was excellent in water resistance.

On the other hand, as shown in Table 2, when the solvent was the KCl aqueous solution having a concentration of 0.9 wt/wt % (pH 8), the elution amounts of the silica from the glass tubes 20 of Examples 1 and 2 and Comparative Example decreased with the reduction of the β values. As compared with Comparative Example having a β value of 9.17, numerical values close to the value of the glass tube 20 containing the Type IB borosilicate glass as the raw material were obtained as the silica elution amounts of Examples 1 and 2.

The glass tube 20 molded from a Type IB borosilicate glass having an expansion coefficient of (×10$^{-7}$/K) 51 was examined for the elution of silica in the same manner as in Examples. In the glass tube 20 molded from the Type IB borosilicate glass, the silica elution amount was 4.1 (μg/cm$^2$).

[Elution Amount of Silica (SiO$_2$) from Vial 10]

The silica elution amount was measured for each vial 10 of Examples 1 and 2 and Comparative Example described above. In the vials 10 obtained in Examples 1 and 2 and Comparative Example described above, the silica elution amount was measured by the same method as that of the measurement of the elution amount of silica from the glass tube 20, except charging the solvent to 90% of the full capacity of the vial as a silica elution process. The amounts (μg/cm$^2$) of the silica obtained for each vial 10 of Examples 1 and 2 and Comparative Example are shown in Tables 1 and 2. Table 1 shows the silica elution amount when distilled water for injection was used as the solvent for the elution. Table 2 shows the silica elution amount when the KCl aqueous solution having a concentration of 0.9 wt/wt % (pH 8) was used as the solvent for the elution. The eluted silica amount (μg/cm$^2$) was expressed as a value per surface area of each vial 10. The surface area of the vial 10 was calculated by CAD from the inner diameter, the outer diameter, the length, and the like in terms of the standard.

As shown in Table 1, when the solvent was distilled water for injection, the elution amounts of the silica from the vials 10 after the fire blast treatment of Examples 1 and 2 and Comparative Example were all 0.1 μg/cm$^2$ and were equal in Examples and Comparative Example. Therefore, it was confirmed that the vials 10 molded from the glass tube 20 containing the Type IA borosilicate glass satisfying ψ=0.23±0.02 were also excellent in water resistance.

As shown in Table 2, when the solvent was the KCl aqueous solution having a concentration of 0.9 wt/wt % (pH 8), it was confirmed that 17.6 μg/cm$^2$ of silica and 7.3 μg/cm$^2$ of silica were eluted from the vial 10 after the fire blast treatment of Example 1 and from the vial 10 after the fire blast treatment of Example 2, respectively. On the other hand, it was confirmed that 50.0 μg/cm$^2$ of silica was eluted from the vial 10 after the fire blast treatment of Comparative Example. It was confirmed from the results that, in the vial 10 molded from the glass tube 20 containing the Type IA borosilicate glass satisfying β=7.5±0.5, the silica elution amount was reduced to half or less of the silica elution amount in the case where β=7.5±0.5 was not satisfied and the elution amount was 20.0 μg/cm or less. The numerical values of the silica elution amounts of the vials 10 of Examples 1 and 2 after the fire blast treatment were equal to or less than the value (11.3 μg/cm$^2$) of the vial 10 molded from the glass tube 20 containing the Type IB borosilicate glass as the raw material.

Figure 2:
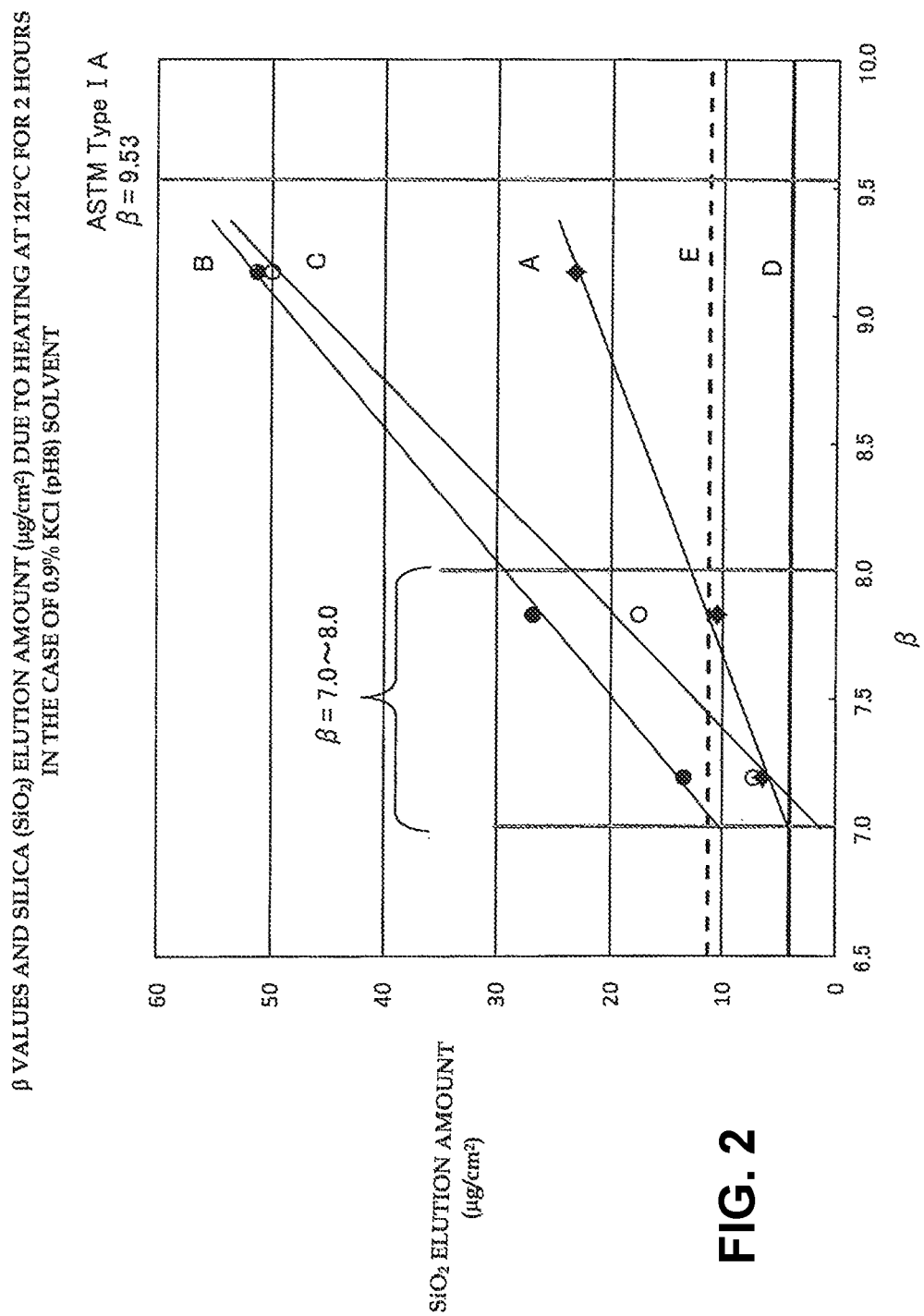
FIG. 2 is a graph showing the relationship between the amount of silica ($SiO_2$) eluted from a glass tube, a vial before fire blast treatment, and a vial after fire blast treatment and β relating to the composition of oxides contained in a glass tube as the raw material of each of the glass tube, the vial before fire blast treatment, and the vial after fire blast treatment.

FIG. 2 is a graph showing the relationship between β relating to the composition of the borosilicate glass and the amount of silica (SiO$_2$) eluted due to heating at 121° C. for 2 hours using the high ionic strength solution of 0.9 wt/wt % KCl aqueous solution (pH 8). In FIG. 2, A (♦) represents the results of the glass tubes 20 as the raw material of Examples 1 and 2 and Comparative Example, B (•) represents the results of the vials 10 before the fire blast treatment of Examples 1 and 2 and Comparative Example, and C(○) represents the results of the vials 10 after the fire blast treatment of Examples 1 and 2 and Comparative Example. In FIG. 2, the Y-axis represents the amount of the silica (SiO$_2$) eluted due to heating at 121° C. for 2 hours using a high ionic strength solution of 0.9 wt/wt % KCl aqueous solution (pH 8) and the X-axis represents the β values.

For comparison, a glass tube 20 containing a Type IB borosilicate glass as the raw material and a standard vial 10 molded from the glass tube 20 containing a Type IB borosilicate glass as the raw material were confirmed for the elution of the silica into the 0.9 wt/wt % KCl aqueous solution (pH 8) in the same manner as in Examples. The standard vial is a vial which was not subjected to surface treatment, such as ammonium sulfate treatment and fire blast treatment. In FIG. 2, a straight line D represents the elution amount of the silica from the glass tube 20 containing the Type IB borosilicate glass as the raw material and a straight line E represents the elution amount of the silica from the standard vial 10 molded from the glass tube 20 containing the Type IB borosilicate glass as the raw material.

From the eluted silica amount and the β values, each approximation straight line illustrated in FIG. 2 were obtained by a least-square method. It was accepted that, in the Type IA borosilicate glass, the elution of the silica from the glass tube into the high ionic strength solution is further reduced with a reduction in the β values. The amount of the silica eluted from the glass tube of the Type IA approaches the amount of the silica eluted from the glass tube of Type IB in the range of β=7.5±0.5. More specifically, it was confirmed for the vial 10 molded from the glass tube 20 containing the Type IA borosilicate glass as the raw material that the elution of the silica into to the high ionic strength solution was equal to or less than the value of the vial 10 molded from the glass tube 20 containing the Type IB borosilicate glass as the raw material in the range of β=7.5±0.5.

REFERENCE SIGNS LIST

10 Vial
15 Inner surface
20 Glass tube
30 Point burner
31 Flame

The invention claimed is:

1. A medical vial containing a Type I Class A borosilicate glass for storing an alkaline high ionic strength solution containing 0.1 mol/L or more of alkali salt, in which silica corrosion is reduced to be comparable to that for Type I Class B borosilicate glass, the medical vial produced by a method comprising:

molding a glass tube containing a Type I Class A borosilicate glass as a raw material into a medical vial having a desired vial shape, in which a molar ratio of oxides contained in the Type I class A borosilicate glass satisfies ψ=0.23±0.02 in ψ=[(Na$_2$O+K$_2$O)—Al$_2$O$_3$]/B$_2$O$_3$ and satisfies β=7.5±0.5 in β=B$_2$O$_3$/Al$_2$O$_3$, and in which an alkali borate is volatilized during said molding, said alkali borate reacting with the borosilicate glass to form a deteriorated layer in the medical vial; and fire blasting the medical vial, after said molding, so that a flame of the medical vial is applied to said deteriorated layer which evaporates and removes said deteriorated layer; and wherein when said medical vial stores said alkaline high ionic strength solution containing 0.1 mol/L or more of alkali salt, elution of silica from said borosilicate glass is reduced relative to an amount of silica elution that would occur for said medical vial having said deteriorated layer prior to said fire blasting, said elution of silica being reduced to be comparable to that for Type I Class B borosilicate glass;

wherein Type I Class A borosilicate glass differs chemically from Type I Class B borosilicate glass by having a greater amount by weight of silicon dioxide and boron oxide and a lesser amount by weight of aluminum oxide than Type I Class B borosilicate glass; and wherein Type I Class A borosilicate glass is characterized as low-expansion borosilicate glass with physical properties including a linear coefficient of expansion over the range 0 to 300° C. of 32-33 cm/cm-° C.×10$^{-7}$±1.5.

2. The medical vial according to claim 1, produced by the method further comprising the step:

heating the medical vial after the fire blast step at 121° C. for 2 hours in a state where the medical vial is immersed in the high ionic strength solution; and quantifying said silica eluted into the high ionic strength solution to be 20.0 μg/cm$^2$ or less by measuring the silica using inductively coupled plasma atomic emission spectroscopy, the high ionic solution having a KCl concentration of 0.9 wt/wt % and a pH of 8 from an area per cm$^2$ in a total surface area of the medical vial.

3. The medical vial according to claim 1, wherein Type I Class A borosilicate glass is further characterized by physical properties including: an annealing point of 560° C.±10, a softening point of 815-820° C.±10, and an annealed density of 2.23-2.24 g/cm$^3$±0.02; and by a chemical composition including: 81%-83.27% by weight silicon dioxide, 11.15%-13% by weight boron oxide, and 1.21%-2% by weight aluminum oxide; and wherein Type I Class B borosilicate glass is characterized as an alumina-borosilicate glass having physical properties including: a linear coefficient of expansion over the range 0 to 300° C. of 48-56 cm/cm-° C.×10$^{-7}$±2, an annealing point of 574° C.±10, a softening point of 783-799° C.±10, and an annealed density of 2.33-2.36 g/cm$^3$±0.02.

4. The medical vial according to claim 3, wherein Type I Class B borosilicate glass is further characterized by a chemical composition including: approximately 73% by weight silicon dioxide, 10% by weight boron oxide, and 7% by weight aluminum oxide.

* * * * *